(12) United States Patent
Phillips et al.

(10) Patent No.: US 6,389,579 B1
(45) Date of Patent: May 14, 2002

(54) RECONFIGURABLE LOGIC FOR TABLE LOOKUP

(75) Inventors: Christopher E. Phillips, San Jose; Dale Wong, San Francisco; Laurence H. Cooke, Los Gatos, all of CA (US)

(73) Assignee: Chameleon Systems, Los Altos, CA (US)

( * ) Notice: Subject to any disclaimer, the term of this patent is extended or adjusted under 35 U.S.C. 154(b) by 0 days.

(21) Appl. No.: 09/238,648

(22) Filed: Jan. 26, 1999

Related U.S. Application Data

(60) Provisional application No. 60/072,466, filed on Jan. 26, 1998.

(51) Int. Cl.[7] .............................................. G06F 17/50
(52) U.S. Cl. ......................................................... 716/6
(58) Field of Search .................... 716/2, 5, 16; 712/204

(56) References Cited

U.S. PATENT DOCUMENTS 5,610,829 A * 3/1997 Trimberger .................. 716/16
5,812,414 A * 9/1998 Butts ............................ 716/16

* cited by examiner

*Primary Examiner*—Matthew Smith
*Assistant Examiner*—Thuan Do
(74) *Attorney, Agent, or Firm*—Burns, Doane Swecker & Mathis LLP

(57) ABSTRACT

An integrated circuit which contains a processor, and configurable logic with configuration memory such that the configurable logic can emulate a large memory array when the contents of the array are very sparse. This structure allows for fast access and a continuous updating capability while remaining internal to the chip. A methodology for recompressing the contents of the configurable logic while updating the configurable logic is also described.

26 Claims, 6 Drawing Sheets

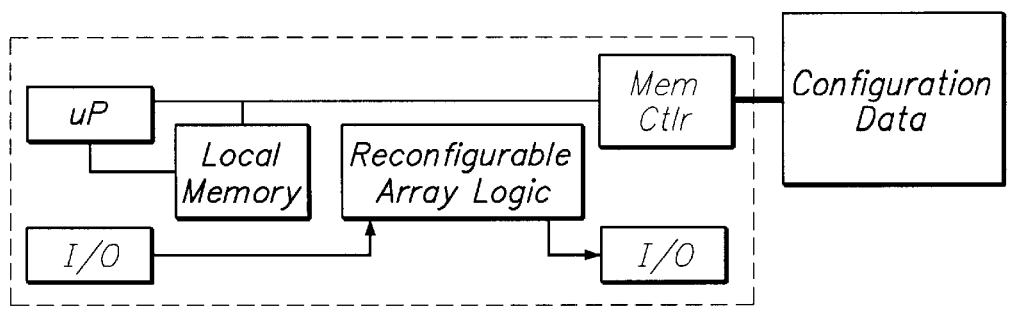
FIG. 1
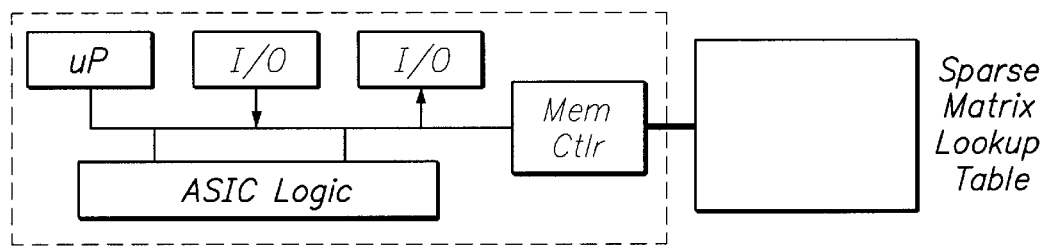
FIG. 2 (PRIOR ART)
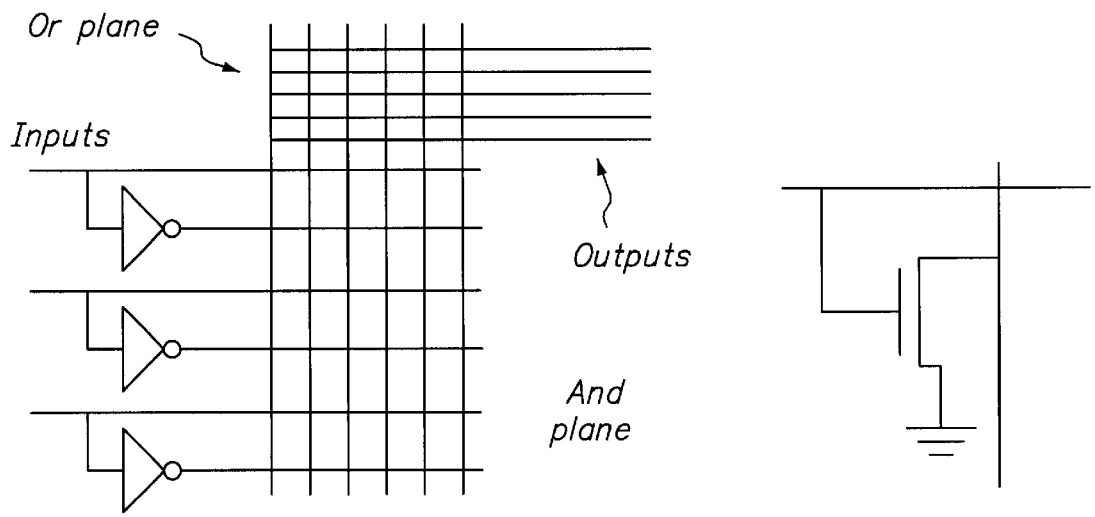
FIG. 3a (PRIOR ART)
FIG. 3b (PRIOR ART)

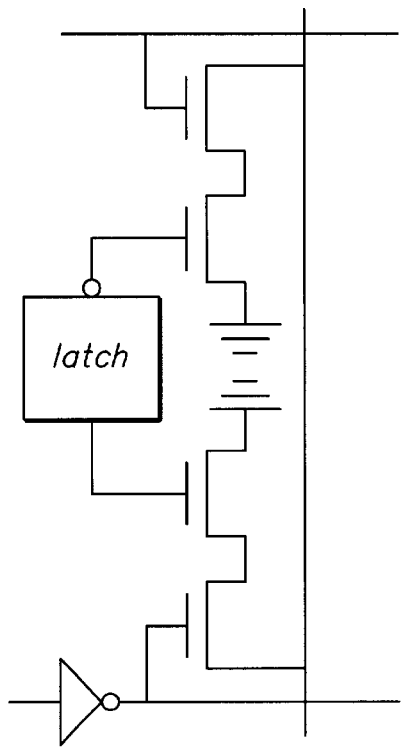 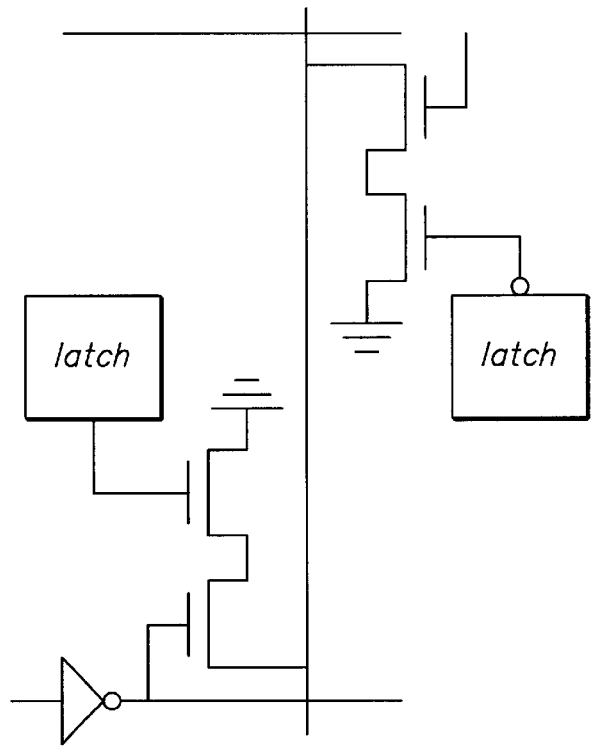
FIG. 7a          FIG. 7b
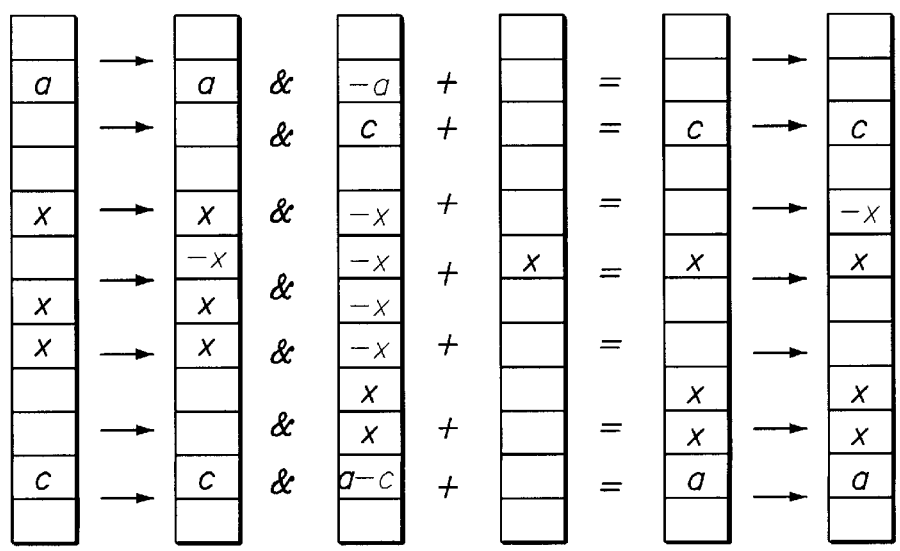
FIG. 8

Test and set logic

And Plane Lines

RECONFIGURABLE LOGIC FOR TABLE LOOKUP

This application claims priority to U.S. Provisional Application Serial No. 60/072,466, filed Jan. 26, 1998, which application is incorporated herein by reference in its entirety.

BACKGROUND OF THE INVENTION

1. Field of the Invention

The present invention relates to hardware for performing a table lookup in a large relatively sparse lookup table with limited types of entries.

2. State of the Art

With the advent of inexpensive high performance processors, a growing number of applications are using standard RISC processors to perform dedicated tasks within non-computing products. In many applications these embedded processors' most frequent task is to access large external memory arrays. External memory can take anywhere from four to tens of system clock cycles to access. As a result, these repetitious "table lookup" functions have become the activity which limits the performance of the products they are embedded in. It has become possible to create single semiconductor integrated circuits which incorporate the processor and some amount of memory. An on-chip memory access can take as little as two clock cycles, so for small lookup tables, a much faster single chip implementation is feasible. Unfortunately, if the application requires a large lookup table, the memory and processor cannot be integrated into a single chip.

If the table never changes, such as the case where the table that is accessed is contained in a Read Only Memory (ROM), and the data contained in the ROM is relatively sparse, i.e. contains many repeating values or empty entries, then the ROM could be converted into random logic and integrated into a single chip with the processor, since the amount of logic would be far smaller than the silicon area required for the ROM. The logic synthesis technique for doing this is well known, and tools exist to do this conversion automatically.

This hard-wired logic approach will not work if the data changes. Many applications, most notably networking routers, have data in large tables, in this case routing directories, which may change every few minutes. Reconfigurable logic on the other hand, is designed to be frequently updated, so reconfigurable logic could be used to contain the lookup table information. One example of reconfiguration logic is a PLA (Programmable Logic Array). FIG. 3a shows the AND/OR planes of a PLA, while FIG. 3b shows a typical horizontal input line driving an n-channel transistor connected to an AND line and GROUND. The output and line is charged up and any of the transistors in the column can pull the entire vertical wire low.

Most programmable logic solutions require hundreds of milliseconds to reprogram. Unfortunately, in many applications, the memory must be read frequently, which eliminates the ability to reconfigure it without unacceptably interrupting service. Furthermore, it usually takes a number of hours to place and route a new design in programmable logic, so the new changes would take a long time to incorporate.

A problem addressed by the present invention is shown in the prior art of FIG. 2. In this case, a processor looks up data in an external memory to translate information coming into a chip from one IO bus (the arrow pointing in) and then send it out (the arrow pointing out) to another external IO bus. This operation requires four external bus operations, and the processor must wait for the memory to return the proper value.

SUMMARY OF THE INVENTION

The present invention, generally speaking, provides hardware speedup for a table lookup operation. In an exemplary embodiment, a processor is integrated with a special type of reconfigurable logic. Preferably, the reconfigurable logic has the feature of being both partially and fully reconfigurable as necessary. The partial reconfiguration can be used to update the tables while in full operation, and the full reconfiguration can be done when it is necessary to reorganize the entire lookup table. This approach has the advantage of flexibility and speed which the other options lack.

BRIEF DESCRIPTION OF THE DRAWING

FIG. 1 shows a system in which the present invention may be used;

FIG. 2 shows a prior art method of external memory access;

FIG. 3a shows a prior art embodiment of a PLA;

FIG. 3b shows a circuit detail of the PLA of FIG. 3a;

FIG. 7a shows one specific option within the lookup table memory;

FIG. 7b show another specific option within the lookup table memory;

FIG. 8 shows a compression technique and how it is applied to the lookup table memory structure;

FIG. 9b shows a re-implementation of a final programming state in FIG. 9a;

DETAILED DESCRIPTION OF THE PREFERRED EMBODIMENTS

In accordance with the preferred embodiment of the present invention, a method is presented for implementing a lookup table in reconfigurable logic.

The present approach to lookup table access can significantly improve the performance of accessing large lookup tables that have relatively few different types of outputs in a relatively sparse table, such as the router tables for computer network routing. An exemplary embodiment of a design for hardware speedup of table lookup is shown in FIG. 3. A chip contains a microprocessor, local memory and the reconfigurable logic array. External to the chip is configuration data, which the processor uses to determine the reconfiguration of the logic array. In FIG. 1, the data comes into the reconfigurable array logic from the IO bus and straight back out the other IO bus. It only requires two external bus operations and has many cycles faster response than the prior art approach of FIG. 2.

Figure 4:
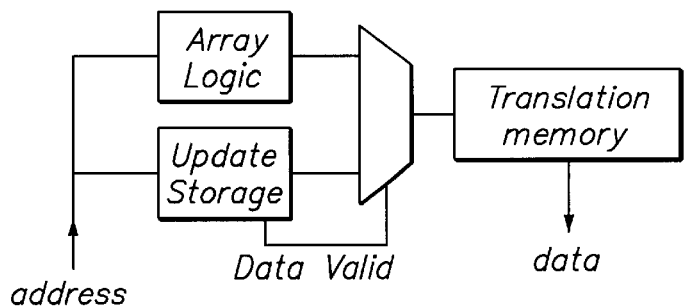
FIG. 4 is a logical diagram of lookup table logic.

The Reconfigurable Logic Array may be very much like the PLA of FIG. 3a and FIG. 3b. The Reconfigurable Logic Array must be able to update individual entries as they come into the table, but also must be able to accept a totally new compressed map of the table. One way to do this is shown in FIG. 4. In this embodiment the Reconfigurable Logic Array is comprised of the array logic block, a block of Update Storage memory, preferably a Content Addressable Memory, a MUX switch, and a Translation Memory.

Figure 5:
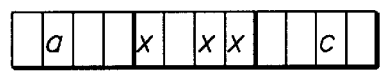
FIG. 5 is a diagram of lookup table sparse data.

In operation, the table is compressed: first the individual entries are combined, and then the output values are compressed into an address for the proper output value. The actual output values are loaded into the Translation Memory. Now the device can translate addresses to the correct data. If updates are added, they are put in the Update Storage. Subsequently, whenever the addressed contents are in the Update Storage, the unit turns on the data valid line, which selects the output from the Update Storage. The output is a number between 1 and N where N is the number of types of data in storage. This output must then be translated through the Translation Memory to get the actual output values. For example, in FIG. 5 the sparse matrix contains three types of elements: a, c, x. These would be translated into 1, 2, or 3 and then translated back to a, c, or x, the proper output values.

In some embodiments the Reconfigurable Logic Array could be a PLA, PLD, or FPGA. In some embodiments the Update Storage could be Content Addressable Memory (CAM) or RAM with hash pointers and a processing engine. In some embodiments the Translation Memory could be a PLA, SRAM, or some other memory without an address decode.

The Reconfigurable Logic Array structure of FIG. 4 does not make as efficient use of its Update Storage memory as it could. Ideally, if the Array Logic and the Update Storage were integrated together, an abundance of entries in the table could be offset by less required updates, or vice versa.

Figure 6:
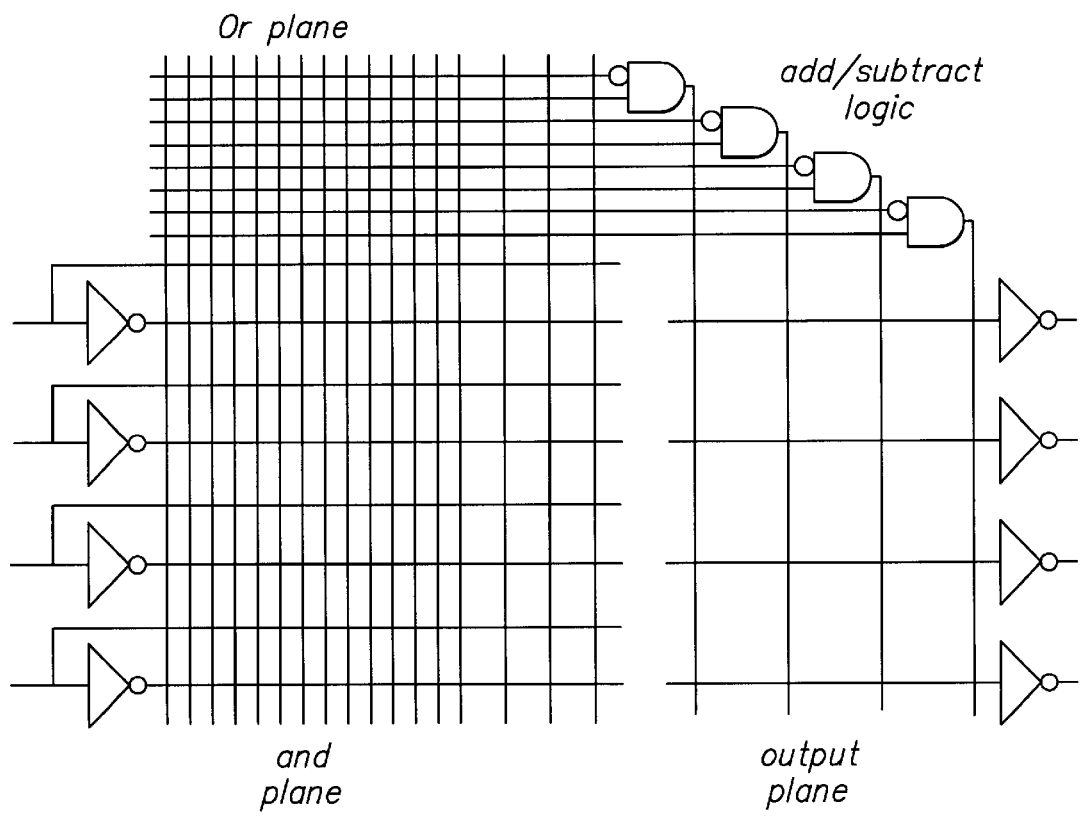
FIG. 6 is one embodiment of the lookup table memory.

In yet another embodiment, Array Logic and Update Storage are combined in the form of a special PLA of the structure shown in FIG. 6. Each of the AND lines (vertical) are of one of the two types shown in FIG. 7a and FIG. 7b. The type shown in FIG. 7a has one bit per pair of input lines, and contains a specific address. If the address is an exact match, the lines will all turn off, at which point the AND line goes high. In the second type shown in FIG. 7b, there are two bits for each address line input. In this case, blocks of addresses can be selected. In other embodiments, these latches may be multiple bits allowing switching between multiple planes of logic configuration, or they may be EEPROM transistors or also storage means which would take even less area than the latch.

Referring again to FIG. 6, the OR plane has inputs from the AND plane. It is ORing up all the addresses that are selected. There are two types of OR lines (upper horizontal), ones that drive the two input AND gate directly, and the others that invert the input signal to the AND gate, in the add-subtract logic. In this case the positive input is the OR of all the addresses that are in the table for this type of output, and the inverting input is the OR of all the addresses that are specified to be not in the table, for this output. Note that the output from these AND gates drive other OR lines to other AND gates, as well as the output plane. This allows for updated additions and subtractions to existing output types, a necessary capability to update the logic. The output from the AND gates goes to the output plane to translate the AND gate line into the proper value for that output. Note that in this array the number of unique types of entries in the array cannot exceed the number of AND gates in the add-subtract logic.

Compression of the original data put into the Reconfigurable Logic Array can be seen in FIG. 8. FIG. 8 shows a series of example lookup tables with entries. This is a pictorial representation of the lookup table with updates. Each box is a memory address starting at 0 counting up to 11 in this example.

Figure 9A:
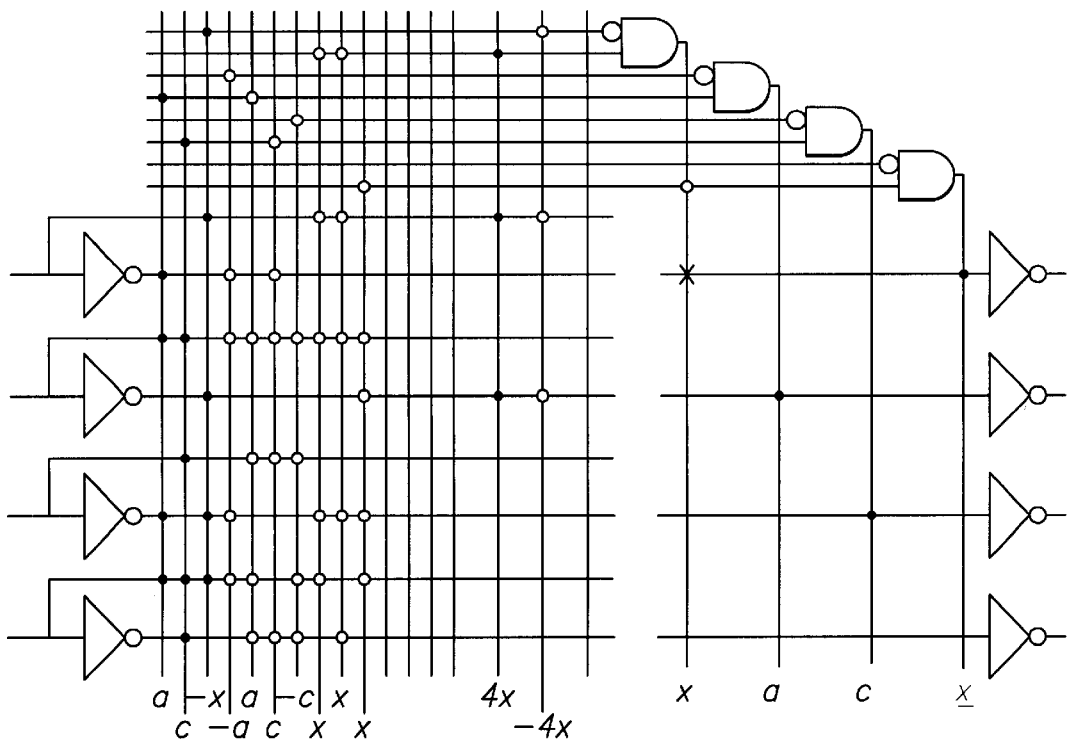
FIG. 9a show various states of programming.

Referring to FIG. 9a, a schematic diagram is shown of a PLA-like hardware structure like that of FIG. 6 for performing table lookup in accordance with the example of FIG. 8. In FIG. 9a, filled dots represent an original configuration of the hardware structure and hollow dots represent changes to the original configuration.

Addresses are input to the hardware structure and the hardware structure outputs an index value that is then translated into an output value. Hence, address bits are input along the left side of the hardware structure and index bits (only one of which is active at a particular time in accordance with the presently described embodiment) are output along the right side of the hardware structure. The MSB and LSB of the address are as indicated.

Each programmed line of the AND plane is labelled in accordance with an index value determined wholly or partly in accordance with that AND line. Take, for example, the AND line labeled "a" As seen in FIG. 8, "a" is stored in location 10 (with the locations numbered from bottom to top), or binary 1010. When the binary address 1010 is applied to the address inputs therefore, line "a" should remain high. When any other binary address is applied to the address inputs, line "a" should be pulled low. The dots in FIG. 9a represent the "pull-down" condition. Hence, in the case of "a," when the MSB is "false" the AND line should be pulled low, when the next significant bit is "true" the AND line should be pulled low, when the next significant bit is "false" the AND line should be pulled low, and when the least significant bit is "true" the AND line should be pulled low. The same logic may be followed with respect to the "c" AND line, which should remain high with the binary address 0001 is applied.

In the OR plane, notice that an OR line connected to the "a" AND line is not connected to any other AND line, and that the OR line connects to a "true" input of an AND gate within the add/subtract logic. The output of the AND gate is labelled the "a" line within the add/subtract plane. The "a" add/subtract line is connected to a particular output line. The same description applies to the "c" AND line and the "c" add/subtract line.

Unlike the indices "a" and "c," the index "x" appears multiple times (three times) within the table of FIG. 8. Using the add/subtract logic, the multiple instances of "x" can be represented using two AND lines, a "4x" line and a "−x" line, instead of three "x" lines, achieving a savings of one AND line. The index "x" appears in locations 4, 5 and 7. Assume for the moment that "x" also appeared in location 6, i.e., in binary locations 0100, 0101, 0110 and 0111. These locations can also be represented as 01XX, where "X" represents a "don't care" condition. In order to provide for don't care conditions, the AND plane is divided into a left-hand portion in which the AND lines are of the type shown in FIG. 7a and a right-hand portion in which the AND lines are of the type shown in FIG. 7b. Don't care conditions can only be represented using the right-hand portion of the AND plane. In the case of the index "x," the pull-down condition occurs when the MSB is true or when the next-significant bit is false, resulting in the connections shown in FIG. 9a. The "4x" AND line is connected to in the OR plane to an OR line that in turn connects to a true input of an AND gate in the add/subtract logic.

Of course, the index "x" does not really appear in location 6, and the output line for index "x" should not be asserted when the address 6 is applied. To accomplish this, a "−x" is added to the AND plane, programmed to respond to the address 6 being applied. In the OR plane, however, the "−x" AND line is connected to an OR line that connects in turn to an inverting input of the same AND gate in the add/subtract logic. As a result, the output of the AND gate is asserted when address 4, 5 or 7 is applied but is deasserted when the address 6 (or any other address besides 4, 5 or 7) is applied. The "x" add/subtract line is connected to a particular output line. Because this connection will be changed in the course of changes to the lookup table (to be presently described), it is represented by an X.

Of the six different columns, or states of the lookup table represented in FIG. 8, the hardware structure of FIG. 9a with the filled dots only realizes the second state, which is also equivalent to the first state. Assume now that the lookup table is to be changed to the third state. Consider first the "positive" changes: "a" is to be added to location 1, "x" is to be added to locations 2 and 3, and "c" is to be added to location 9. The manner in which these positive changes is made will be apparent from the foregoing description. Consider now the "negative" changes: "c" is to be deleted from location 1, "x" is to be deleted from locations 4, 5 and 7, and "a" is to be deleted from location 10. In the case of the negative changes for "a" and "c," a new negative AND line is programmed with the same programming as the original positive AND line. The original positive AND line is connected to an OR line that connects in turn to the true input of an AND gate in the add/subtract plane, and the new negative AND line is connected to an OR line that connects in turn to the false input of the same AND gate in add/subtract plane. As a result, the output of the AND gate, which before would have been asserted when the address in question was applied, will now be deasserted when that address is applied.

Just as the multiple "x" indices were treated as a block, so can the multiple "x" indices also be treated as a block, by adding a "−4x" AND line. The "4x" and "−4x" AND lines connect through the OR plane to true and false inputs, respectively, of the same AND gate in the add/subtract plane. Note that the "−x" AND line and the "−4x" AND line connect to same OR line, because the address to which the "−x" AND line corresponds is one of the addresses to which the "−4x" AND line corresponds.

Assume now that a further change is to be made to the lookup table to add "x" at location 6. This change is represented in the fourth state of the lookup table in FIG. 8, the complete state of the lookup table following the change being represented in the fifth state in FIG. 8. Note that the address of the positive "x" to be added is one of the addresses negated by the "−4x" AND line. To provide for this situation, a cascading feature of the add/subtract logic is used. An "x" AND line is added and connected through the OR plane to the true input of an unused AND gate in the add/subtract logic. The output of the AND gate in the add/subtract logic that previously served as the final output for the index "x" is then OR-connected to the same true input of the new AND gate in the add/subtract logic. The output signal for the index "x" is disconnected from the output signal of the old AND gate (hence the X in FIG. 9a) and is connected to the output signal of the new AND gate.

Figure 9B:
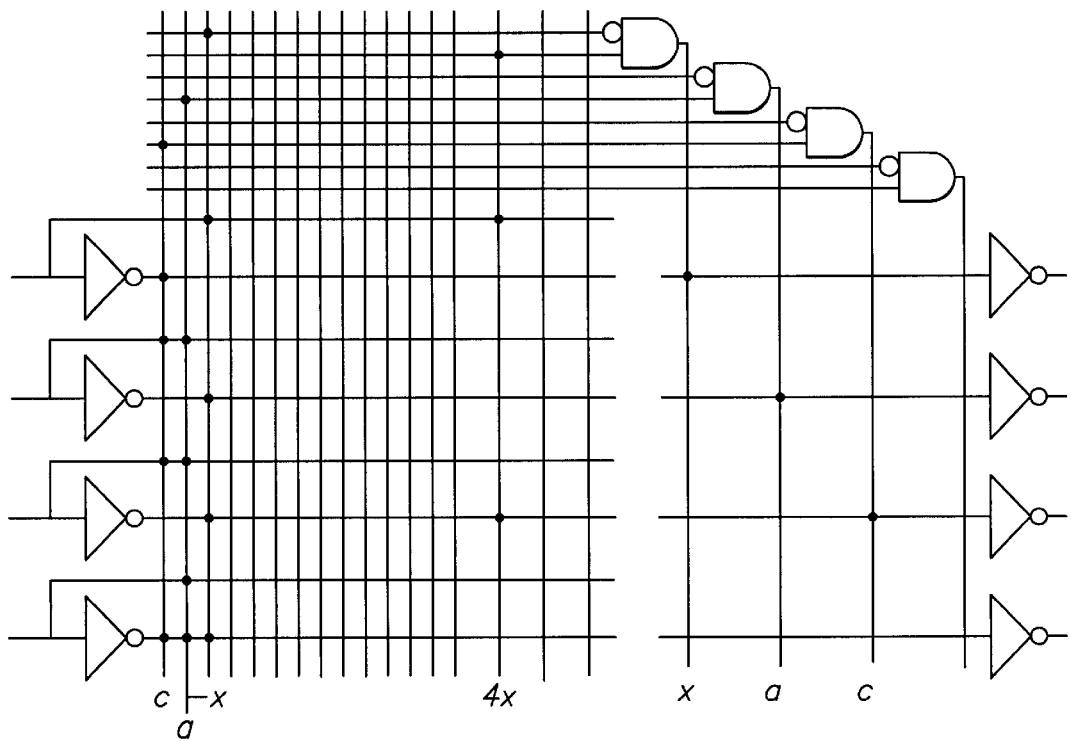

Assume now that the final lookup table, stage 6 of FIG. 8, is to be re-implemented from scratch. The re-implementation will be considerably simpler than the implementation of FIG. 9a. First, an AND line for "c" is created, then an AND line for "a," the two single indices. The three "x" indices may, as before, be treated as a "4x" AND line and "−x" AND line. Note that the four locations consisting of the three "x" indices and the "−x" index need not be contiguous as in the former case. In this instance, two "x" indices in locations 2 and 3 are separated by locations 4 and 5 from the "x" index and "−x" index in locations 6 and 7, respectively. Re-implementation results in the configuration of FIG. 9b.

A more detailed description of this methodology is described below.

The inputs to the method may be of two forms: 1) a single entry, and 2) a collection of multiple entries (hereafter referred to as a "table"). A single entry consists of a unique identifying key and any number of data fields associated with the key. For example, in an IPv4 RIP network routing table entry, the key would be the 32-bit destination IP address, and the associated data fields would include the 32-bit forwarding IP address, port id, and routing metric. (In the example of FIG. 8, the indices "a," "c," and "x" serve as indices to keys stored in translation memory along with associated data fields. The keys are applied as addresses to look up the corresponding indices.) A table is a collection of 1 to 2 * * 32 such entries, with no duplicate keys between entries, and all entries containing at least one designated data field. For example, in an IPv4 RIP network routing table, the designated data field would be the forwarding IP address. The purpose of a table is to support a "lookup" function, where a value for the key field is input, the table is searched for a an entry whose key field matches the input value, and the value of a designated field on the matching entry is output. For additional information on the example RIP table format, please refer to "Routing Information Protocol", RFC 1058, C. Hedrick, Rutgers University, June 1988.

Assume that the input to the method is a table. The physical representation of this table may vary. Possible representations include, but are not limited to: a text file, a binary image stored in computer memory, or a binary stream over an IO channel. This table is then converted into hardware logic by the following steps:

1. Group the entries of the table according to a designated data field or fields. If the table contains N distinct values for the designated data field(s), there will be N groups of entries formed.
2. For each group of entries, do the following:
   a. List all the values of the keys of all the entries in the group. There will be a unique value for each entry in the group.
   b. Treating each bit of the key field as a Boolean input, create a single Boolean function which evaluates to TRUE when its inputs match any of the list of key values in the group, and which evaluates to FALSE otherwise. Call the output of this function the "Match Line" for the group. One possible embodiment for the Boolean function is a Programmable Logic Array (PLA).
3. Create a decoding function whose inputs are the Match Lines of the Boolean functions created in Step 2, and whose output is the value of the designated data field(s) of the group whose Match Line is TRUE. Note that at most one Match Line can be TRUE since, by definition, all the entries' keys are unique. Also, designate a special value, called "NULL", to be output in case no Match Line is TRUE, and this NULL value, by definition, is not allowed in the designated field(s) of any entry. One possible embodiment of the decoding function is a multiplexor (MUX) whose select lines are controlled by the Match Lines and whose inputs come from a register file filled with the values of the designated field(s).

4. Call the totality of logic created in Steps 2 and 3 the "Hardware Lookup Table", whose inputs are the bits of the key field, and whose outputs are the value of the designated field(s) which is associated with the input key. After an initial Hardware Lookup Table is created, our method allows incremental updates to the Table. The time required to process an incremental update is less than that required to build an entire Hardware Lookup Table. The updates may be in the form of a single entry or a table. In the case of a table, each entry of the table will be processed as if it were a single entry.

The process for updating one or more single entries is as follows:

1. For each entry, do the following:
   a. Create a hardware function whose input is the value of the key, and whose output is the value of the associated designated field(s). Call the collection of all such entries the "Update Store".
2. Create a hardware function to search the Update Store for a given key, and return the value of the associated designated field(s) if found, and return NULL otherwise. Call this function the "Update Matcher". One possible embodiment for both the Update Store and Update Matcher of Steps 1 and 2 is a Contents Addressable Memory (CAM).
3. Tie together the inputs of the Update Matcher and the Hardware Lookup Table.
4. Create a hardware function, called the "Merged Table", whose inputs are the outputs of the Update Matcher and the Hardware Lookup Table. If the Update Matcher returns NULL, the Merged Table returns the output of the Hardware Lookup Table, otherwise the Merged Table returns the output of the Update Matcher. One possible embodiment for the Merged Table is a MUX whose select lines are controlled by the output of the Update Matcher, and whose inputs are the output of the Update Matcher and the output of the Hardware Lookup Table.

After a number of incremental updates have been performed, the entire Merged Table can be re-implemented as a new Hardware Lookup Table with an emptied Update Store. This may be necessary since the Update Store has a finite capacity and updates may continue to be required. The re-implementation may be invoked automatically by a signal that the Update Store is almost full, or as a regularly scheduled maintenance task, or under the control of a higher level supervising process. The re-implementation process is identical to the process of building an initial Hardware Lookup Table, but the input will be the concatenation of the original table and all the updates. One possible embodiment would have a separate process continuously concatenate the original table with each update, in parallel to the creation of the Update Store and Update Matcher. In such an embodiment, there would be two copies of the table: one in the Merged Table, and another "mirrored" in, for example, a binary image in computer memory. The mirrored copy could be used as the input to the re-implementation process.

Figure 10:
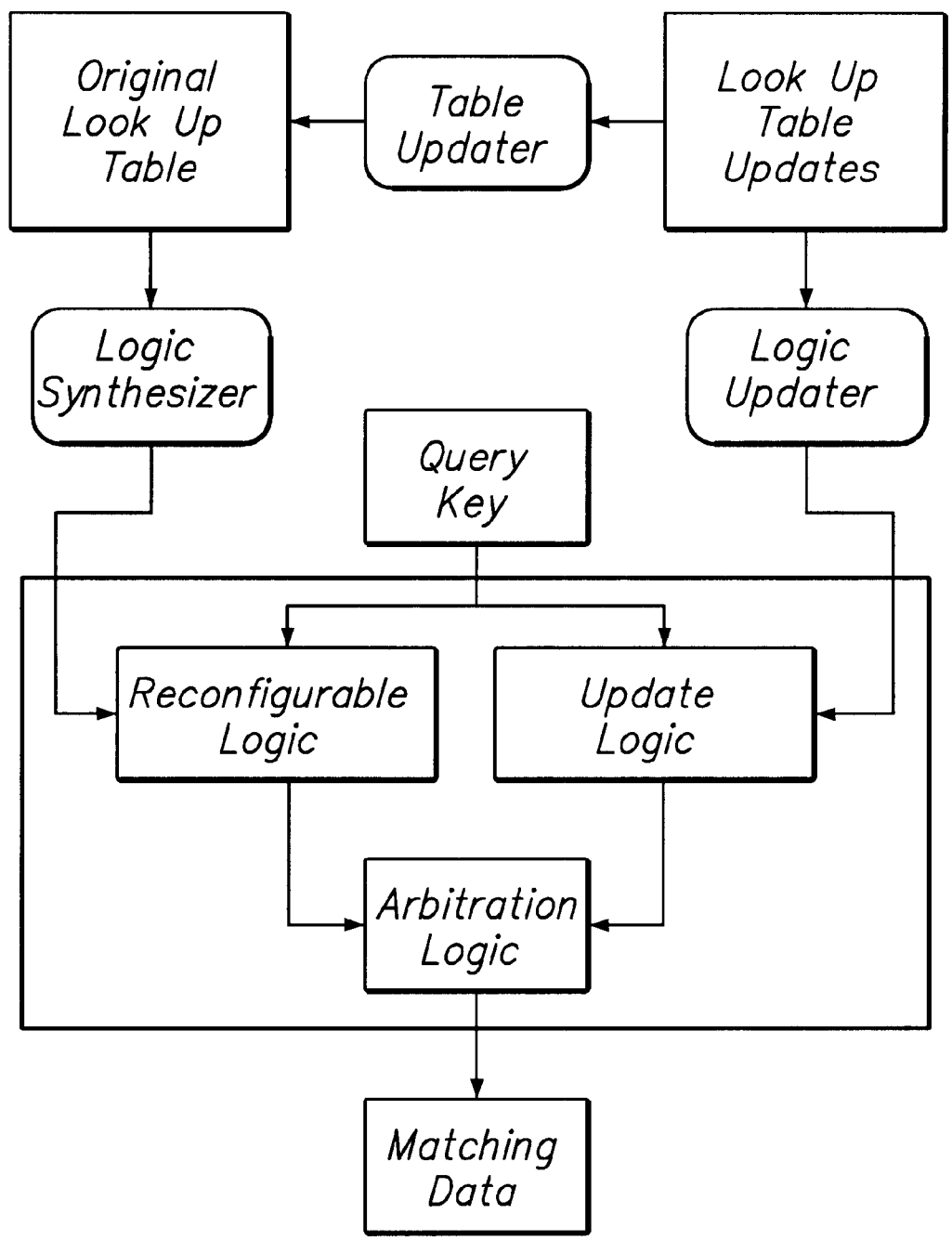
FIG. 10 shows the flow of generating, updating and accessing a lookup table.

A flow chart of the procedure described above can be seen in FIG. 10. FIG. 10 shows the periodic compression of the current data base by the processor, which then rewrites the entire Reconfigurable Array Logic. In between these complete rewrites the processor writes just the additions, which, when they collide with the original data, must use another AND gate from the add/subtract logic to properly include the new updates. In this way the updates as well as the compressed data are handled in one compact structure.

Figure 11:
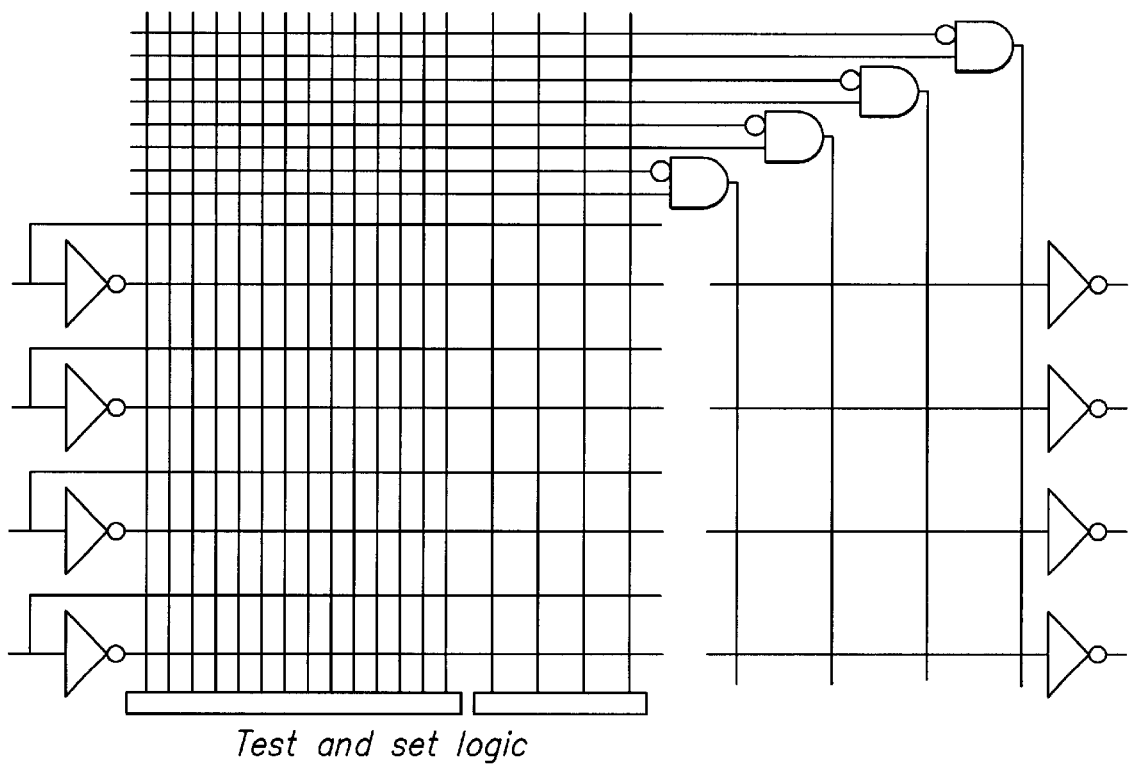
FIG. 11 shows another embodiment of the lookup table memory.
Figure 12:
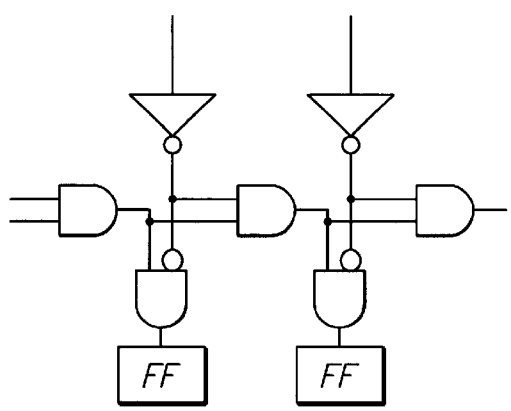
FIG. 12 shows test and set logic for the embodiment shown in FIG. 11.

In another embodiment, as shown in FIG. 11, there is additional test and set logic. The details of this logic are shown in FIG. 12. What this logic does is find the first occurrence of a particular entry. Note that in FIG. 11 there are two blocks of test and set logic. One is for the AND lines which can only contain a single address as shown in FIG. 7a, and the other is for those that can handle a range of addresses as shown in FIG. 7b. This allows the controller to manage both resources, and delete entries from the single address lines, while adding one that can handle a range of addresses as necessary to do data compression. The flip-flops FF in FIG. 12 drive enable lines for reading or writing the latches shown in FIG. 7a and FIG. 7b for the AND and OR planes. The following procedure can be applied to this structure to compress in place. For each entry, apply the entry to the Reconfigurable Array logic looking for a match. If it exists, the FF will be set for the column it exists in. This column can then be read or rewritten. Similarly any key can be looked at. Also there is one address, called null, which is never used. Initially all AND lines which are unused contain the null value. With the test and set logic, the equivalent of an automatic linked list of available lines results. Given this capability, the following procedure can be applied to the Reconfigurable Array logic, either by the processor, a microcontroller or a simple state machine and registers.

Build the logic one table entry or update at a time. If there is a whole table, process it one entry at a time. For each new entry we access the array to find an inexact match. An inexact match may be found, for example, by applying an input word with one or more "don't care" bits ti-stated, and observing the output. For now, assume that a match is defined as all bits identical except for the least-significant-bit. For example:

new entry's key: 10101010 existing entry's key: 10101011

If a match a match is found, there is no need to add the new entry. Instead, the existing entry is modified by changing the least-significant-bit to a don't-care:

modified entry's key: 1010101X

In the case a match is found, the "compression" can possibly ripple upwards. A search is performed for all the existing entries for a match in the second-least-significant-bit:

modified entry's key: 1010101X matching entry's key: 1010100X

If a match is found, one of the entries is deleted and the other one is modified:

modified entry's key: 101010XX

Then the process attempts to ripple the compression to the next bit, until it fails to find a match. When the process fails to find a match, it checks if the closest match was only off by 1 bit. For example:

modified entry's key: 101010XX closest match key: 1010110X

If a new "negative" entry is added, the closest match can be compressed:

closest match key: 1010110X negative key: 1010111X compressed key: 101011XX

The new compressed key can now be matched and then the next bit can be compressed:

modified entry's key: 10101XXX negative key: 1010111X

Then the rippling process can be continued to the next bit. In this manner the data can loaded, updated and compressed all at the same time. As a result the cascading feature of the first embodiment is not necessary. In some embodiments, one or more of the components (Reconfigurable Logic Array, Update Store, Translation Memory, and/or processor) may reside in separate integrated circuits. Furthermore, each individual component may be partitioned into multiple integrated circuits.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An apparatus comprising:
   a processor; and
   coupled to the processor, configurable logic and associated configuration latches for defining a fast sparse table lookup function.

2. The apparatus of claim 1, further comprising memory for storing updates to the sparse table lookup function and associated logic for selecting between the table lookup function and the updates.

3. The apparatus of claim 1, wherein the configurable logic comprises a PLA structure including AND and OR planes.

4. The apparatus of claim 3, further comprising a translation plane coupled to the OR plane.

5. The apparatus of claim 4, further comprising translation logic coupled to the OR plane and the translation plane, whereby updates can be added without changing existing contents of the PLA structure.

6. The apparatus of claim 3, further comprising test and set logic coupled to the configurable logic such that the configuration latches can be accessed using the contents of a subset of the configuration latches.

7. The apparatus of claim 1, wherein said processor is a microcontroller.

8. The apparatus of claim 1, wherein said processor comprises a state machine and associated registers.

9. A table lookup method using configurable logic, comprising the steps of:
   compressing a large sparse table to minimize resources required by the configurable logic; and
   using the configurable logic to execute the table lookup function.

10. The method of claim 9, further comprising:
    storing in external memory the entire sparse lookup table; and
    executing a program on a processor to compress the sparse lookup table during operation of the configurable logic.

11. A method of updating a configurable sparse table lookup function comprising the steps of:
    providing updates to the configurable logic;
    maintaining a separate complete and current lookup table;
    compressing the lookup table; and
    providing a new configuration to the configurable logic.

12. The method of claim 11, further comprising using test and set logic to access and update the configuration latches when performing the updates and compression.

13. The method of claim 11, updating the lookup table in parallel with accessing the lookup table, such that an external system need only supply entries to be added or deleted from the table.

14. The method of claim 11, wherein the steps of providing updates, compressing the lookup table, and providing a new configuration to the configurable logic are iteratively repeated.

15. A method for incrementally updating an existing hardware lookup table, comprising the steps of:
    receiving an incremental update; and
    processing the incremental update in less time than the time required to build an entire table;
    wherein the updates may be in the form of a single entry or a table.

16. A method for implementing a look up table for performing lookup of data by keys in accordance with key/data associations, comprising the steps of:
    converting key-and-data-associations into a programmable logic implementation of a boolean function whose inputs are the bits of the keys and whose outputs are the bits of the data; and
    evaluating the boolean function.

17. The method of claim 16, further comprising capturing updates in both programmable logic and in a format suitable for programmable logic implementation of the boolean functions.

18. A method for implementing a look up table for performing lookup of data by keys in accordance with key/data associations, comprising the steps of:
    converting key-and-data-associations into a programmable logic implementation of a boolean function whose inputs are the bits of the keys and whose outputs are the bits of the data;
    evaluating the boolean function;
    grouping entries of a table according to one or more designated data field;
    for each group of entries:
      listing all the values of the keys of all the entries in the group;
      treating each bit of the key field as a boolean input, creating a single boolean function which evaluates to TRUE and asserts a match line for the group when its inputs match any of the list of key values in the group, and which evaluates to FALSE and deasserts the match line otherwise; and
      creating a decoding function whose inputs are the match lines of the groups and whose output is the value of the one or more designated data fields of the group whose match line is TRUE;
    wherein the boolean function and the decoding function realize a hardware lookup table.

19. The method of claim 18, further comprising designating a special NULL value to be output in case no match line is TRUE, wherein the NULL value is not allowed in the one or more designated fields of any entry.

20. The method of claim 18, further comprising:
    creating for a plurality of entries an update store hardware function whose input is the value of a key, and whose output is the value of the associated one or more designated fields;

using an update matcher hardware function to search the update store for a given key, and returning the value of the associated designated fields if found, and return NULL otherwise;

coupling together inputs of the update matcher hardware function and the hardware lookup table; and create a merged table hardware function whose inputs are the outputs of the update matcher hardware function and the hardware lookup table;

wherein if the update matcher hardware function returns NULL, the merged table hardware function returns the output of the hardware lookup table, otherwise the merged table hardware function returns the output of the update matcher hardware function.

21. A method for implementing a lookup table in reconfigurable logic wherein each bit of the key field is treated as a Boolean input, by creating a single Boolean function which evaluates to TRUE when its inputs match any of the list of key values in the group, and which evaluates to FALSE otherwise.

22. A machine-implemented method comprising the steps of:

incrementally updating an existing reconfigurable logic implementation of a lookup table; and simultaneously compressing the existing reconfigurable logic implementation of a lookup table.

23. The method of claim 22, wherein the lookup table is implemented in one of an embedded processor, a state machine, or and a controller.

24. A method for compressing a reconfigurable logic implementation of a lookup table, comprising:

adding one or more negative entries which do not exist in the original lookup table and which complete a contiguous block of existing entries such that the contiguous block can be represented by a single entry with an increased number of don't care bits relative to the existing entries alone; and the configurable logic implementation negating the compressed block with the one or more negative entries.

25. A method for incrementally updating and simultaneously compressing an existing reconfigurable logic implementation of a lookup table, comprising:

iteratively selecting a single bit position;

matching all other bit positions of the update entry with all other existing entries in the lookup table; and re-encoding all matches with don't-care bits in the selected bit position.

26. The method of claim 25, wherein if the closest matching existing entry differs from a perfect match in exactly one bit position, adding a new negative entry which is identical to the closest matching entry except that the differing bit position is set to the one's complement of the corresponding value in the closest matching entry, and compressing the new negative entry and the existing closest matching entry with a don't care bit in the differing bit position.

* * * * *